United States Patent
Almkvist

(10) Patent No.: US 9,874,138 B2
(45) Date of Patent: Jan. 23, 2018

(54) TWIN SCROLL TURBOCHARGER DEVICE WITH BYPASS

(71) Applicant: VOLVO CAR CORPORATION, Gothenburg (SE)

(72) Inventor: Goran Almkvist, Lerum (SE)

(73) Assignee: Volvo Car Corporation, Gothenburg (SE)

(*) Notice: Subject to any disclaimer, the term of this patent is extended or adjusted under 35 U.S.C. 154(b) by 162 days.

(21) Appl. No.: 14/858,231

(22) Filed: Sep. 18, 2015

(65) Prior Publication Data

US 2016/0090903 A1    Mar. 31, 2016

(30) Foreign Application Priority Data

Sep. 26, 2014   (EP) .................................... 14186579

(51) Int. Cl.
  *F02D 23/00*   (2006.01)
  *F02B 33/44*   (2006.01)
  (Continued)

(52) U.S. Cl.
  CPC ............ *F02B 37/025* (2013.01); *F01D 9/026* (2013.01); *F01D 17/146* (2013.01);
  (Continued)

(58) Field of Classification Search
  CPC ...... F02B 37/025; F02B 37/18; F02B 37/168; F02B 37/225; F02B 2037/125;
  (Continued)

(56) References Cited

U.S. PATENT DOCUMENTS 3,383,092 A * 5/1968 Cazier .................... F02B 37/02
  415/205
3,614,259 A * 10/1971 Neff ...................... F01D 17/146
  60/602

(Continued)

FOREIGN PATENT DOCUMENTS

EP   2466092 A1 * 6/2012 ............ F02B 37/013
FR   2780445 A1 * 12/1999 ........... F01D 17/146
(Continued)

OTHER PUBLICATIONS

A certified English translation of JP 57200618 A to Kanesaka, published on Dec. 8 1982.*
(Continued)

*Primary Examiner* — Thai Ba Trieu
(74) *Attorney, Agent, or Firm* — Brooks Kushman P.C.

(57) ABSTRACT

A twin scroll turbocharger device for an internal combustion engine includes a turbine and a compressor, wherein the turbine comprises a first turbine scroll and a second turbine scroll, and wherein at least the first turbine scroll is provided with a turbine scroll inlet valve such that the exhaust gas flow through the first turbine scroll is controllable. The twin scroll turbocharger device is further characterized in that a bypass conduit is provided between a compressor and at least the first turbine scroll. The bypass conduit is provided with a bypass conduit valve such that a flow through the bypass conduit is controllable.

11 Claims, 5 Drawing Sheets

(51) Int. Cl.
*F01D 9/00* (2006.01)
*F02B 37/02* (2006.01)
*F02B 37/16* (2006.01)
*F02B 37/22* (2006.01)
*F02B 37/18* (2006.01)
*F01D 9/02* (2006.01)
*F01D 17/14* (2006.01)
*F02B 37/12* (2006.01)

(52) U.S. Cl.
CPC ............ *F02B 37/168* (2013.01); *F02B 37/18* (2013.01); *F02B 37/225* (2013.01); *F02B 2037/125* (2013.01); *F05D 2220/40* (2013.01); *Y02T 10/144* (2013.01)

(58) Field of Classification Search
CPC .... F01D 9/026; F01D 17/146; F05D 2220/40; Y02T 10/144
USPC ........... 60/602, 606, 611, 289, 293; 415/205
IPC ........................................................ F02B 37/02
See application file for complete search history.

(56) References Cited

U.S. PATENT DOCUMENTS

| | | | | |
|---|---|---|---|---|
| 4,373,336 A * | 2/1983 | Horler | ............... | F02B 37/183 60/605.1 |
| 4,833,886 A * | 5/1989 | Meier | ............... | F02B 37/16 60/602 |
| 6,324,848 B1 * | 12/2001 | Gladden | ............... | F02B 37/16 60/605.1 |
| 6,601,388 B1 * | 8/2003 | Gladden | ............... | F02B 37/16 60/605.1 |
| 2013/0014497 A1 | 1/2013 | Wu et al. | | |
| 2014/0219786 A1 | 8/2014 | Zhu et al. | | |
| 2015/0337846 A1 * | 11/2015 | Thelen | ............... | F04D 25/04 415/1 |
| 2015/0345316 A1 * | 12/2015 | Henderson | ............ | F01D 17/105 415/204 |
| 2016/0131021 A1 * | 5/2016 | Baker | ............... | F02B 37/12 60/605.1 |
| 2016/0341115 A1 * | 11/2016 | Almkvist | ............... | F02B 37/02 |

FOREIGN PATENT DOCUMENTS

| | | | |
|---|---|---|---|
| GB | 2277129 A | | 10/1994 |
| GB | 2438360 A | | 11/2007 |
| GB | 2504713 A | | 2/2014 |
| JP | 57200618 A | | 12/1982 |
| JP | 58018522 A | * | 2/1983 |
| JP | 62131923 A | * | 6/1987 |
| JP | 2003120302 A | * | 4/2003 |
| WO | WO 2016166087 A1 | * | 10/2016 ............ F02B 37/025 |

OTHER PUBLICATIONS

BorgWarner Turbo Systems, "Performance Turbocharger Catalog", 2011 Edition, XP055151980, 56 Pages.

Extended European Search Report dated Jan. 8, 2015, Application No. 14186579.0-1606, Applicant Volvo Car Corporation, 7 Pages.

* cited by examiner

TWIN SCROLL TURBOCHARGER DEVICE WITH BYPASS

CROSS-REFERENCE TO RELATED APPLICATIONS

This application claims foreign priority benefits under 35 U.S.C. §119(a)-(d) to European patent application number EP 14186579.0, filed Sep. 26, 2014, which is incorporated by reference in its entirety.

TECHNICAL FIELD

The disclosure relates to a twin scroll turbocharger device for an internal combustion engine (ICE). Such ICE may be arranged in any type of vehicle suitable to be driven by a spark ignited or compression ignited engine.

BACKGROUND

A conventional turbocharger for an ICE is generally most effective when operating at specific operating conditions. The configuration of e.g., the turbine wheel, the compressor wheel and the turbine scroll all influence the properties of the turbocharger and determine at what operating conditions the turbocharger is as effective as possible. When the exhaust gas flow from the ICE is low, such as when operating the engine at low revs or when the engine load is low, it is generally preferred that the turbocharger is small whereas at higher exhaust gas flow it is generally preferred to have a larger turbocharger. In order to obtain a turbocharger that can operate at acceptable performance over a range of exhaust gas flows a turbocharger where the geometry of e.g., the guide vanes can be adapted depending of current exhaust gas flow may be used. Such variable geometry turbocharger may work at optimum flow conditions over a larger range than a conventional turbocharger. However, such turbochargers are generally expensive and not as robust as fixed geometry turbochargers. Another approach in order to improve the efficiency of the turbocharger and increase the range of the turbocharger is by using a twin scroll turbocharger. In twin scroll turbochargers the turbine scroll, extending radially on the outside of the turbine wheel, is divided in two separate scrolls by a separating wall of the turbine housing. When the exhaust gas flow from the ICE is low the flow to one scroll can be closed. By closing one scroll, thus decreasing the total cross sectional flow area available for the exhaust gas flow, the flow rate through the remaining open scroll will be increased, thus the flow rate or velocity of the exhaust gas flow into the turbine will be increased. Increasing the velocity of the exhaust gas flow the turbine wheel is exposed to speeds up of the turbine wheel faster, especially if the outer edges of the turbine blades are exposed to the exhaust gas flow, thus a high degree of charging can be accomplished even at moderate exhaust gas flows. However, at the same time, closing one scroll causes the efficiency of the ICE to drop since there will be an increased resistance for the exhaust gas when entering the partially closed turbine inlet. Another drawback is that due to the lower pressure of the closed scroll there will be some leakage from the open, high pressure, scroll to the low pressure scroll where the scrolls meet. Leakage between the scrolls has negative impact on the turbine efficiency. Thus, there is still a need for further improvements.

SUMMARY

An object of the present disclosure is to provide a twin scroll turbocharger device with improved efficiency and improved performance and to provide a method for controlling such twin scroll turbocharger device. Providing a twin scroll turbocharger device with improved efficiency is achieved by a twin scroll turbocharger device according to the disclosure. Providing a method for controlling such twin scroll turbocharger device is achieved by a method according to the disclosure. Further advantages and advantageous features of the present disclosure are disclosed in the following description and in the dependent claims.

The present disclosure refers to a twin scroll turbocharger device for an ICE. The present disclosure is both applicable for spark ignited ICEs and for compression ignited ICEs. The twin scroll turbocharger device according to the present disclosure comprises:

turbine with a turbine wheel, wherein the turbine wheel is driven by exhaust gas guided from the internal combustion engine, a compressor with a compressor wheel, wherein the compressor wheel is connected to the turbine wheel by an axis such that when the turbine wheel is rotated as is the compressor wheel is rotated, and a turbocharger housing enclosing the turbine and the compressor.

The turbocharger housing is divided in a turbine housing, enclosing the turbine, and a compressor housing, enclosing the compressor. Additionally a turbine inlet, a turbine outlet, a compressor inlet and a compressor outlet is formed by the turbocharger housing. The turbine inlet, turbine outlet, compressor inlet and compressor outlet may also be components separate from the turbocharger housing. When operating the twin scroll turbocharger device exhaust gas discharged from an exhaust manifold of the ICE enters the twin scroll turbocharger device through the turbine inlet and, after circulating and speeding up the turbine wheel, is discharged from the turbine through the turbine outlet. The turbine wheel is connected to the compressor wheel by an axis, wherein when the turbine wheel is rotated by the exhaust gas from the ICE the turbine wheels drives the compressor wheel to be rotated as well. Compressor gas, preferably ambient air, enters the compressor inlet and after passing the compressor and being compressed by the compressor is discharged to a manifold inlet through the compressor outlet. Such arrangement provides that exhaust gas flow from the ICE drives the turbine of the twin scroll turbocharger device such that the compressor pumps compressor gas, preferably ambient air, to the ICE. The functionality of a turbocharger in general is considered to be part of the prior art and is not further described herein.

The twin scroll turbocharger device according to the present disclosure comprises a first turbine scroll and a second turbine scroll. The turbine scrolls are formed in the turbocharger housing as is customary for twin scroll turbochargers. Further, the first turbine scroll is provided with a first turbine scroll inlet valve at the first turbine scroll inlet. By providing a first turbine scroll inlet valve at the inlet of the first turbine scroll, wherein the first turbine scroll inlet valve can be set between an open and a closed position, the exhaust gas flow through the first turbine scroll can be controlled. The open position is when the valve is provided such that exhaust gas may flow freely through the scroll past the valve. The closed position is when the valve is provided such that no exhaust gas may flow past the valve. By controlling the exhaust gas flow through the first turbine scroll the flow rate through remaining scroll can be increased as previously has been described.

According to the present disclosure the twin scroll turbocharger device also comprises a bypass conduit, wherein the bypass conduit is provided between a pressurized portion of the compressor and a portion of the first turbine scroll provided downstream, in relation to the exhaust gas flow, of said first turbine scroll inlet valve, wherein a passage for fluid communication between the compressor and the first turbine scrolls is provided.

When hereafter referring to that the bypass conduit is connected to a pressurized portion of the compressor this should be read as that the bypass conduit is connected (such that said compressor and bypass conduit is in fluid communication) to the pressurized side of said compressor, thus at a portion of the compressor where the compressor wheel has started to compress the compressor gas fed to the compressor. In practice, this means that the bypass conduit is connected to the compressor at a portion of the compressor downstream of where the compressor wheel affects the pressure in the compressor. Correspondingly, when hereafter referring to that the bypass conduit is connected to a turbine scroll this should be read as that the bypass conduit is connected (such that said bypass conduit and said turbine scroll is in fluid communication) to concerned turbine scroll at a portion of concerned turbine scroll that is provided downstream, in relation to the exhaust gas flow, of said turbine scroll inlet valve, thus after the valve, in relation to the exhaust gas flow, capable of closing the flow through respective turbine scroll. The turbine scroll is considered to end at a portion of the turbine provided after the exhaust gas flowing through the turbine scroll affect the turbine wheel.

The bypass conduit is provided with a bypass conduit valve. The bypass conduit valve can be controlled to be set between an open and a closed position. The open position is when the valve is provided such that compressor gas from the compressor, preferably ambient air, may flow freely through the conduit past the valve. The closed position is when the valve is provided such that no compressor gas may flow past the valve. Thus, said bypass conduit valve is configured to control a flow through said bypass conduit.

The bypass conduit is connected to the compressor such that the bypass conduit is in fluid communication with the compressor. At what position the bypass conduit is connected to the compressor may e.g., be dependent on current vehicle compartment and ICE design. The only restriction is, as previously has been concluded, that the bypass conduit is connected to the compressor downstream of where the rotation of the compressor wheel is starting to increase the pressure of in the compressor, thus the pressurized part of the compressor. According to a preferred development of the present disclosure the bypass conduit is connected to the compressor at a position such that the length of the bypass conduit is minimized. According to another preferred development the connection between the compressor and the bypass conduit is preferably arranged such that the flow direction of the compressor gas when entering the bypass conduit is essentially maintained. This will minimize the bypass conduit backpressure.

Correspondingly, the bypass conduit is connected to the turbine scroll such that the bypass conduit is in fluid communication with at least one turbine scroll provided with a turbine scroll inlet valve. At what position the bypass conduit is connected to concerned turbine scroll/scrolls may e.g., be dependent on current vehicle compartment and ICE design. The only restriction is, as previously has been concluded, that the bypass conduit is connected to concerned turbine scroll downstream of respective turbine scroll inlet valve. According to a preferred development of the present disclosure the bypass conduit is connected to the compressor such that the length of the bypass conduit is minimized. According to another preferred development the connection between the turbine housing and the bypass conduit is preferably arranged such that the flow direction of the gas when being discharged from the bypass conduit is directed in essentially the exhaust flow direction of the turbine scroll when being in an open position. This will minimize the bypass conduit backpressure as well as further improve the efficiency of the twin scroll turbocharger device with bypass. Minimizing the length of the bypass conduit minimizes the pressure losses through said bypass conduit.

The present disclosure enables that, when the exhaust gas flow from the ICE is low and one turbine scroll is closed, compressed air may be bypassed from the compressor back to the closed turbine scroll. An advantage with the present disclosure is that by enabling bypass of compressor gas to the closed turbine scroll the recirculating compressor gas increase the mass flow through the compressor and thereby counteracts compressor surge. A further advantage with the present disclosure is that it is possible to recover the energy in the bypass boost in the blocked scroll, whereby the energy utilization and the overall ICE efficiency is increased. Also, implementing the present disclosure on a compression ignited ICE has an additional advantage. Compression ignited ICEs generally have higher exhaust back pressure than charge pressure whereby scavenging may be problematic. By implementing the present disclosure, where the exhaust back pressure in the blocked scroll is significantly lower, these problems can be avoided.

The present disclosure is applicable both for ICEs comprising conventional manifolds as well as for ICEs comprising pulse separated manifolds.

According to a development of the present disclosure said second turbine scroll is provided with a second turbine scroll inlet valve at a second turbine scroll inlet such that also the exhaust gas flow through said second turbine scroll inlet of said second turbine scroll is controllable. According to this development said bypass conduit connects a pressurized portion of said compressor with both said first and said second turbine scroll, at a portion of respective turbine scroll downstream, in relation to the exhaust gas flow, of respective turbine scroll inlet valve, allowing fluid communication between the compressor and said first and/or said second turbine scroll. Said bypass conduit valve additionally is configured to control if the compressor is in fluid communication with said first and/or said second turbine scroll. Thus, according to this development of the present disclosure a three way passage is formed by said bypass conduit between the compressor and respective first and second turbine scroll, wherein the bypass conduit is connected to respective first and second turbine scroll at a portion of respective first and second turbine scroll that is provided downstream of respective first and second turbine scroll inlet valve. Said bypass conduit valve provided in said bypass is configured to control the flow through said bypass conduit.

Providing both the first and the second turbine scroll with a turbine scroll inlet valve each improves the controllability of the twin scroll turbocharger device additionally since it provides the advantage that the turbine can be operated in three different modes; a first mode where the first turbine scroll is closed and the second turbine scroll is open, a second mode where the second turbine scroll is closed and the first turbine scroll is open and a third mode where both the turbine scrolls are open. (Naturally, both the first and the second turbine scroll may be closed and respective turbine scroll inlet valve may be set in a position between being open or closed, leaving the turbine to operate in an intermediate operating mode.)

The bypass conduit, comprising the bypass conduit valve, is preferably controlled to comply with the mode of the turbine. When the first turbine scroll inlet valve is closed the bypass conduit is open to the first turbine scroll and when the second turbine scroll inlet valve is closed the bypass conduit is open to the second turbine scroll.

This development of the present disclosure is particularly advantageous if the cross sectional flow areas of the first and second turbine scroll are different. This will be discussed more in detail later in the description.

There are also engine operation conditions where the compressor operates efficiently when operating the engine with one closed turbine scroll and closed bypass conduit. Operating the engine and the twin scroll turbine turbocharger accordingly are also possible according to the present disclosure. For some engine operating conditions the most efficient configuration may be driving with both turbine scroll inlet valves and the bypass conduit valve open. This is also enabled by the present disclosure.

According to a further development of the present disclosure the valves may be steplessly regulated whereby there is no limitation in terms of degree of openness. Respective valve can be set in any position between an open position and a closed position, meaning that respective valve also can be completely open or completely closed. According to one preferred development of the present disclosure said valves are of butterfly valve types.

According to one development of the present disclosure the first and second turbine scrolls are arranged side by side with reference to a rotational direction of the turbine wheel. Arranging the turbine scrolls side by side, which will be further disclosed in the following detailed description, is the conventional way to provide a twin scroll turbocharger device, but it is also possible to arrange one turbine scroll outwardly in a radial direction of the other turbine scroll with reference to the turbine wheel. Such twin scroll turbocharger design may be advantageous since the exhaust gas flow entering the turbine will have a different flow profile which may enable the turbine blades to be hit by the exhaust gas in more advantageous manner, providing faster speed up of the turbine. Arranging one scroll outwardly in a radial direction to the other scroll has the advantage that that leakage between the scrolls is lower than when the scrolls are arranged side by side. The leakage between the scrolls is an important aspect to consider, particularly in operating modes where only one turbine scroll is utilized, since it affects the efficiency of the turbine. Depending on the current engine design such arrangement may also be advantageous from a packaging perspective. For some engine designs it might be easier to arrange one turbine scroll outwardly in a radial direction of the other turbine scroll than to fit in two scrolls side by side.

For developments of the present disclosure where only the exhaust gas flow through one of the turbine scrolls is controllable it is preferred that it is the flow through the scroll that is arranged furthest away from the compressor wheel that is controllable. If one scroll is arranged outwardly in a radial direction of the other scroll with reference to said turbine wheel it is preferred that the flow through the outer of the scrolls can be controlled, thus that the outer turbine scroll is provided with a turbine scroll inlet valve at the turbine scroll inlet.

According to yet one development of the present disclosure the first turbine scroll is the turbine scroll arranged furthest away from the compressor wheel whereby the second turbine scroll is provided closest to the compressor wheel.

Referring to one development of the present disclosure where the turbine scrolls are provided side by side; this means that the second turbine scroll is the turbine scroll provided next to the compressor wheel and that the first turbine scroll is provided on the side of the second turbine scroll facing away from the compressor wheel.

Referring to the development of the present disclosure where one turbine scroll is provided outwardly in a radial direction of the other turbine scroll; the second turbine scroll will be arranged inside of the first turbine scroll.

According to one development of the present disclosure the first and second turbine scrolls have the same cross sectional flow area. According to another development of the present disclosure the turbine scrolls have different cross sectional flow areas. Having different cross sectional flow areas of the turbine scrolls improves the possibilities to optimize the flow through the turbine scrolls depending on the characteristics of the turbocharger and current exhaust gas flow from the ICE, wherein the output of the turbocharger can be optimized. Depending on current vehicle engine compartment design and the design of the ICE may also different scroll design be advantageous from an engine packaging perspective.

Which of the turbine scrolls that are has smaller cross sectional flow area and which if the turbine scrolls that has larger cross sectional flow area may also be dependent on e.g., the characteristics of the turbocharger. This also applies to which of the two turbine scrolls the bypass conduit is provided.

Thus, according to one development of the present disclosure the first turbine scroll has a larger cross sectional flow area than the second turbine scroll wherein according to another development the second turbine scroll has a larger cross sectional flow area than the first turbine scroll.

The size of respective turbine scroll and to what scroll the bypass conduit is provided are examples of parameters that has to be determined case by case based on e.g., given vehicle and ICE parameters and above all based on the turbocharger characteristics. These parameters are preferably selected such that best possible operating parameters are obtained for respective vehicle design.

According to another development of the present disclosure the turbine scroll provided closest to the compressor wheel has larger cross sectional area than the other turbine scroll, thus the second turbine scroll has a larger cross sectional flow area than the first turbine scroll. According to another development of the present disclosure the turbine scroll provided furthest away from the compressor wheel has larger cross sectional area than the turbine scroll provided closer to the compressor wheel, thus the first turbine scroll has a larger cross sectional flow area than the second turbine scroll.

An object of the present disclosure is also to provide methods for controlling the twin scroll turbocharger device.

According to one method for controlling a previously disclosed twin scroll turbocharger device where:

the first turbine scroll inlet of the first turbine scroll is provided with a first turbine scroll inlet valve, such that a flow through said first turbine scroll can be controlled, and the compressor is provided with a bypass conduit connecting:

a pressurized portion of the compressor with a portion of the first turbine scroll provided downstream, in relation to the exhaust gas flow, of the first turbine scroll inlet valve, wherein the compressor and the first turbine scroll may be in fluid communication, and the bypass conduit is provided with a bypass conduit valve to control the flow through said bypass conduit, the method comprises the steps of:
when an exhaust gas flow from the internal combustion engine is equal to or less than a predetermined low flow
closing the first turbine scroll inlet valve, and
setting said bypass conduit valve such that said bypass conduit is open to the first turbine scroll.

Thus, the exhaust gas will only flow through the second turbine scroll.

The predetermined low flow is preferably set such that below that exhaust gas flow, given the characteristics of the present turbocharger, the turbine is most efficient if operated with only one of the two turbine scrolls open.

According to one development the method further comprises the steps of: when the exhaust gas flow from ICE exceeds a predetermined high flow
setting all turbine scroll inlet valves to be open, and
setting said bypass conduit valve to be closed.

Thus the exhaust gas flow will flows through said first and second turbine scroll and no compressor gas will be bypassed from the compressor to neither of the turbine scrolls.

The predetermined high flow is preferably set such that above that exhaust gas flow, given the characteristics of the present turbocharger, the turbine is most efficient if operated with both turbine scrolls open.

According to one further development of the method, when implemented for a development of the twin scroll turbine turbocharger device comprising:
a bypass conduit arranged to be in fluid communication with both the first and the second turbine scroll, wherein
the bypass conduit is connecting:
the pressurized portion of the compressor with
a portion of the first turbine scroll provided downstream, in relation to the exhaust gas flow, of the first turbine scroll inlet valve and with
a portion of the second turbine scroll provided downstream, in relation to the exhaust gas flow, of the second turbine scroll inlet valve, and wherein
the bypass conduit valve is provided with functionality to control both the flow through the bypass conduit and to control to which turbine scroll bypass is provided from the compressor, and
both the first and the second turbine scroll is provided with a turbine scroll inlet valve at respective turbine scroll inlet,
the method additionally comprises the steps of:
when the exhaust gas flow from the ICE, from being below the predetermined low exhaust gas flow, is higher than the predetermined low flow but lower than a predetermined high flow:
opening the first turbine scroll inlet valve,
closing the second turbine scroll inlet valve,
setting the bypass conduit valve such that said bypass conduit is open to the second turbine scroll.

(Thus, the exhaust gas flow will change from flowing through the second turbine scroll to flowing through the first turbine scroll and bypass from the compressor will be provided to the second turbine scroll.)

When said exhaust gas flow from the ICE, from being higher than the predetermined high flow, thus after operating the twin scroll turbocharger device with open first and second turbine scroll inlets and with closed bypass conduit valve, is lower than the predetermined high flow but higher than the predetermined low flow:
closing the second turbine scroll inlet valve,
setting the bypass conduit valve such that said bypass conduit is open to said second turbine scroll.

(Thus, the exhaust gas flow will flow only through the first turbine scroll and bypass from the compressor will be provided to the second turbine scroll.)

When said exhaust gas flow from the ICE, from being lower than the predetermined high flow but higher than the predetermined low flow, decreases to be equal to or lower than the predetermined low flow:
closing the first turbine scroll inlet valve,
open the second turbine scroll inlet valve, and
setting said bypass conduit valve such that said bypass conduit is open to said first turbine scroll.

(Thus, the exhaust gas flow will flow through the second turbine scroll and bypass from the compressor will be provided to the first turbine scroll.)

This most recently described development of the present disclosure is first and foremost beneficial when the first and second turbine scrolls have different cross sectional flow areas. According to a preferred development at low exhaust gas flows, being equal to or lower than the predetermined low flow, the turbine scroll inlet valve of the turbine scroll with larger cross sectional flow area is closed and the bypass conduit is configured to provide bypass from the compressor to the closed turbine scroll with larger cross sectional flow area.

As the exhaust gas flow increases and exceeds the predetermined low flow the closed turbine scroll inlet valve of the turbine scroll with larger cross sectional flow area is opened, the bypass conduit valve changes the bypass to set the compressor to be in fluid communication with the turbine scroll with smaller cross sectional flow area instead of the turbine scroll with larger cross sectional flow area and the turbine scroll inlet valve of the turbine scroll with smaller cross sectional flow area is closed (the different closing/opening of respective valve may be done simultaneously or in any given sequence).

Thus, bypass from the compressor is changed from the scroll with the larger cross sectional flow area to the scroll with the smaller cross sectional flow area when the exhaust gas flow increases. The operating turbine scroll (scroll with open turbine scroll inlet valve) is changed from that the scroll with the smaller cross sectional flow area is operating at lower exhaust gas flows to that the scroll with the larger cross sectional flow area is operating when the exhaust gas flow increases.

As the exhaust gas flow increases even more to exceed the predetermined high flow also the closed turbine scroll inlet valve is opened and the bypass conduit valve is closed wherein both scrolls are open and operating and the bypass conduit is closed.

If the exhaust gas flow decreases to fall below the predetermined high flow, but still is above the predetermined low flow, the turbine scroll inlet valve of the turbine scroll with smaller cross sectional flow area is closed and the bypass conduit valve opens up such that bypass from the compressor to the turbine scroll with smaller cross sectional flow area is provided.

If the exhaust gas flow decreases even more to fall below the predetermined low flow the turbine scroll inlet valve to the turbine scroll with smaller cross sectional flow area is opened, the turbine scroll inlet valve to the turbine scroll with larger cross sectional flow area is closed and the bypass conduit valve changes such that bypass from the compressor to the turbine scroll with larger cross sectional flow area is provided.

The method steps of the above exemplified embodiments of the present disclosure, comprising closing and opening respective valve depending on current exhaust gas flow, may be performed according to any possible sequence or simultaneously.

The method of the present disclosure has the advantage that at any given ICE operating point, which generates a specific exhaust gas flow, the twin scroll turbocharger device with bypass will be operated in an operating mode where the turbine scroll characteristics are chosen to give best possible turbocharger response and bypass is provided to recover as much energy as possible otherwise lost due to that closing one scroll inlet increases the backpressure of the turbine.

A further advantage with the present disclosure is that it is very easy to retrofit a bypass conduit, comprising a bypass valve, to a conventional twin scroll turbine turbocharger in order to obtain the advantages offered by the present disclosure. When mounting a bypass conduit to a conventional twin scroll turbine turbocharger an aspect that has to be considered is that the bypass conduit must be arranged to a turbine scroll provided with a turbine scroll inlet valve. Naturally also control functionalities controlling the bypass conduit has to be implemented in the engine control unit (ECU).

The present disclosure also refers to an internal combustion engine for a vehicle, wherein said internal combustion engine comprises a twin scroll turbocharger device according to any of the developments described herein. Also a vehicle comprising the internal combustion engine is part of the present disclosure.

Closed and open position herein is considered to also include an essentially closed or an essentially open position. In realizations of turbocharging systems and like where valves are used, due to e.g., manufacturing tolerances and thermal effects it is often neither necessary nor possible that respective valve hermetically closes respective conduit, inlet, outlet or like.

BRIEF DESCRIPTION OF THE DRAWINGS

With reference to the appended drawings, below follows a more detailed description of embodiments according to the disclosure cited as examples.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
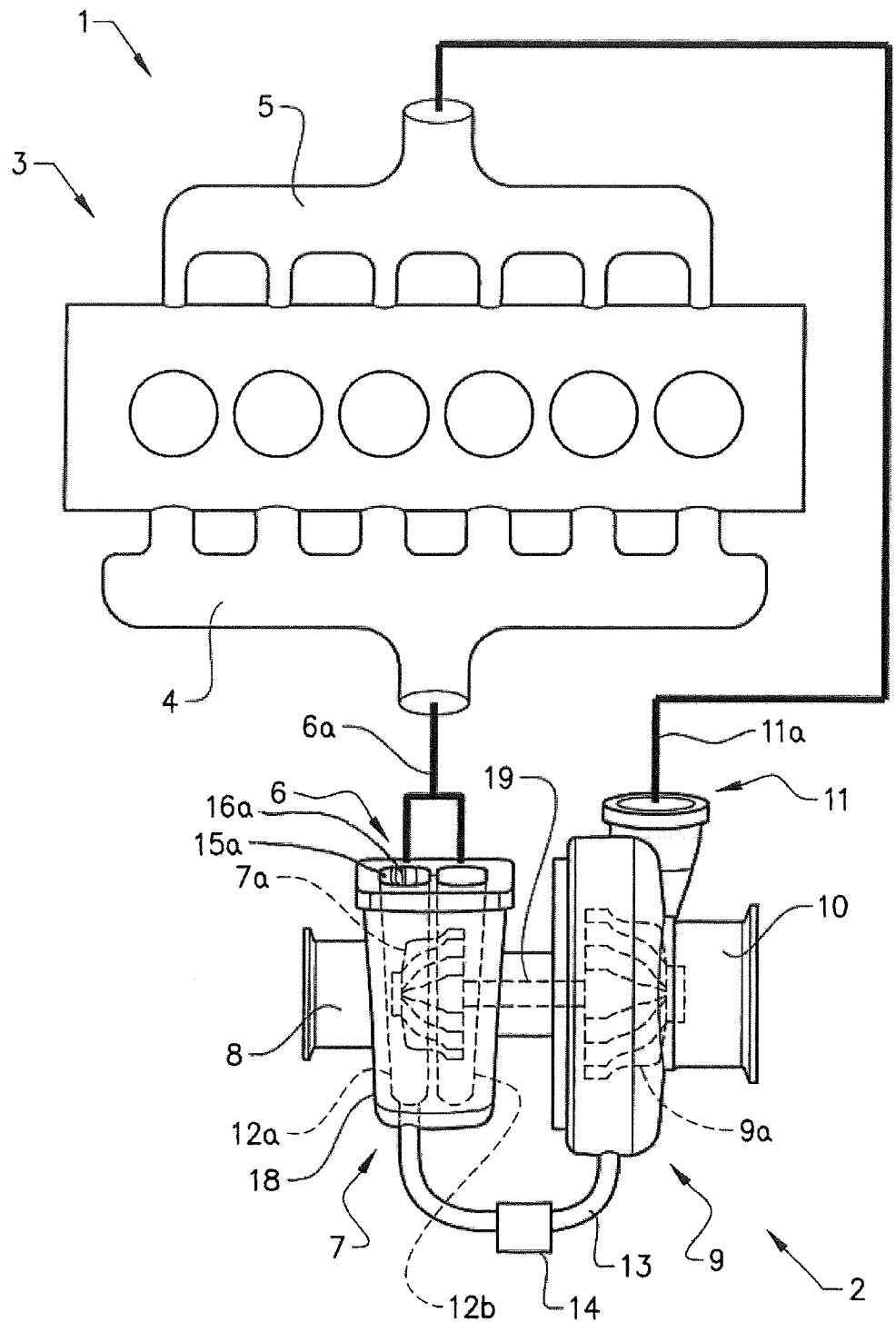
FIG. 1 discloses a schematic view of an Internal Combustion Engine (ICE) provided with an example of a twin scroll turbocharger device according to the present disclosure.

FIG. 1 discloses a schematic engine arrangement 1 comprising an ICE 3 provided with an example of a twin scroll turbocharger device 2 according to the present disclosure. The ICE 3 comprises an exhaust manifold 4 and an intake manifold 5, wherein exhaust gas from the ICE 3 are discharged from the exhaust manifold into a turbine inlet 6 via one or more conduits 6a. The exhaust gas drives a turbine wheel 7a of a turbine 7 of the twin scroll turbocharger device 2 and is subsequently discharged through a turbine outlet 8. The turbine wheel 7a is connected to a compressor wheel 9a of a compressor 9 by an axis 19. The twin scroll turbocharger device 2 is enclosed by a turbocharger housing 18.

The compressor is fed compressor gas, preferably ambient air, from a compressor inlet 10. The compressed gas is compressed in the compressor 9 and subsequently discharged from the compressor 9, through the compressor outlet 11 whereby it is guided to the inlet manifold 5 via one or more conduits 11a. Further, the turbine 7 of the twin scroll turbocharger device 2 comprises a first and a second turbine scroll 12a, 12b and additionally a bypass conduit 13 provided with a bypass conduit valve 14. The bypass conduit 13 connects the compressor 9 with the first turbine scroll 12a of the turbine 7 such that the compressor 9 is in fluid communication with first turbine scroll 12a, whereby bypass between the compressor 9 and the first turbine scroll 12a is enabled. FIG. 1 also discloses a first turbine scroll inlet 15a wherein the first turbine scroll inlet 15a is provided with a first turbine scroll inlet valve 16a.

Figure 2A:
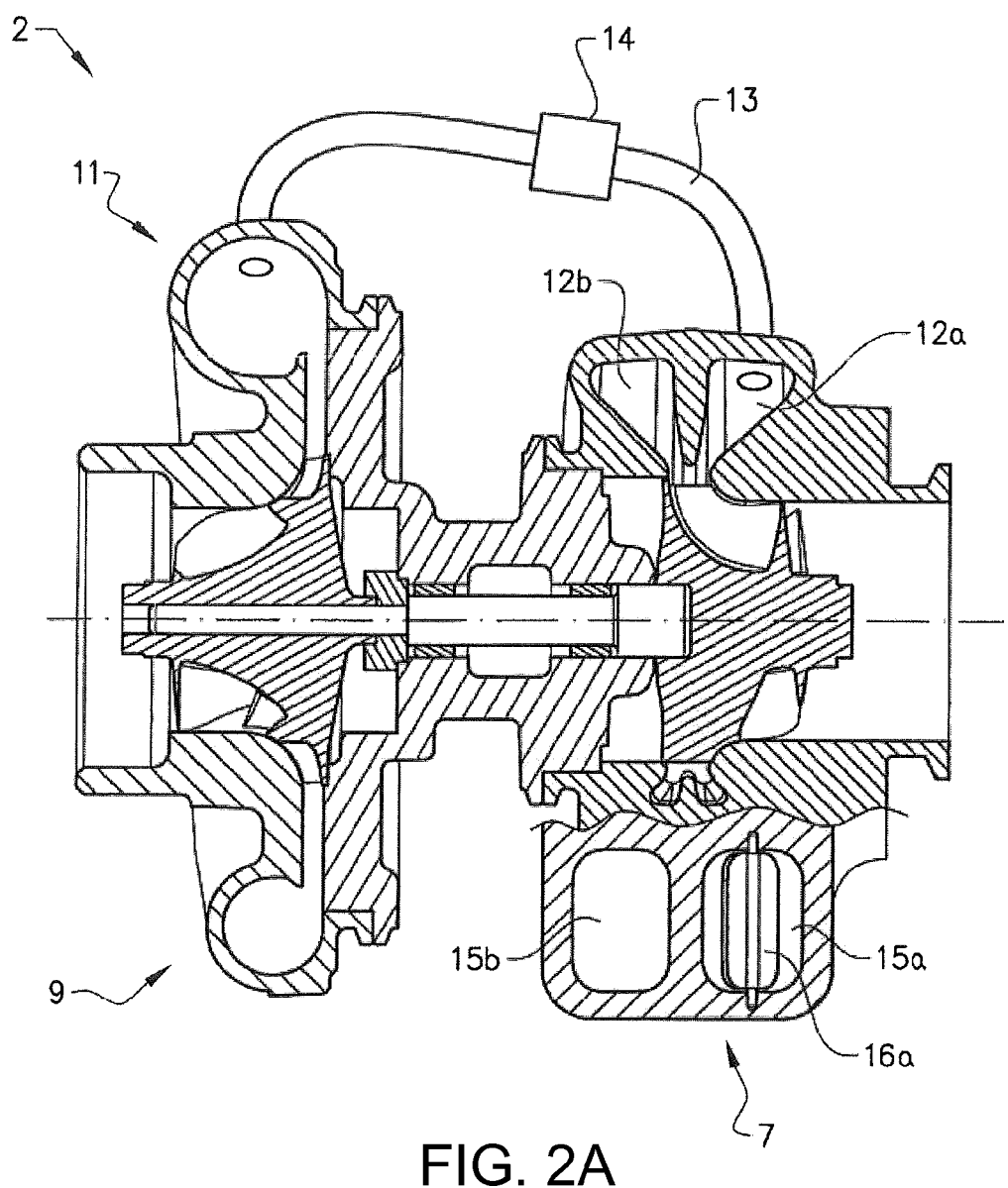
FIG. 2A discloses a preferred embodiment of a twin scroll turbocharger device according to the present disclosure.

FIG. 2A discloses the preferred embodiment of a twin scroll turbocharger device 2 as described in relation to FIG. 1 wherein the twin scroll turbocharger device 2 comprises a first and a second turbine scroll 12a, 12b arranged side by side. The embodiment of the twin scroll turbine device 2 of FIG. 2A discloses how improved turbocharger efficiency can be obtained by providing bypass functionality from the compressor 9 to the first turbine scroll 12a of the turbine 7. FIG. 2A discloses the first and a second turbine scroll inlet 15a, 15b, wherein the first turbine scroll inlet 15a is provided with the first turbine scroll inlet valve 16a. The first turbine scroll inlet valve 16a is configured to control the flow through the first scroll 12a. The twin scroll turbocharger device 2 is provided with a bypass conduit 13 comprising a bypass conduit valve 14, wherein the bypass conduit valve 14 is configured to at least control the flow from a compressor 9 through the bypass conduit 13. The embodiment of the twin scroll turbocharger device 2 disclosed in FIG. 2A enables that at low exhaust gas flows from the ICE, such as when operating the ICE at low revolutions, the first turbine scroll inlet valve 16a is set to be closed.

Closing one of the turbine scroll inlets 15a will increase the exhaust gas flow through the remaining, open second turbine scroll inlet 15b, wherein the flow rate of the exhaust gas through the second turbine scroll 12b in fluid communication with the open second turbine scroll inlet 15b is increased. By setting the bypass conduit valve 14 to be open bypass through the bypass conduit 13, from the turbine 7 to the first turbine scroll 12a, is obtained. Providing such bypass functionality has many advantages such as counteracting compressor surge and improving the overall ICE efficiency.

Figure 2B:
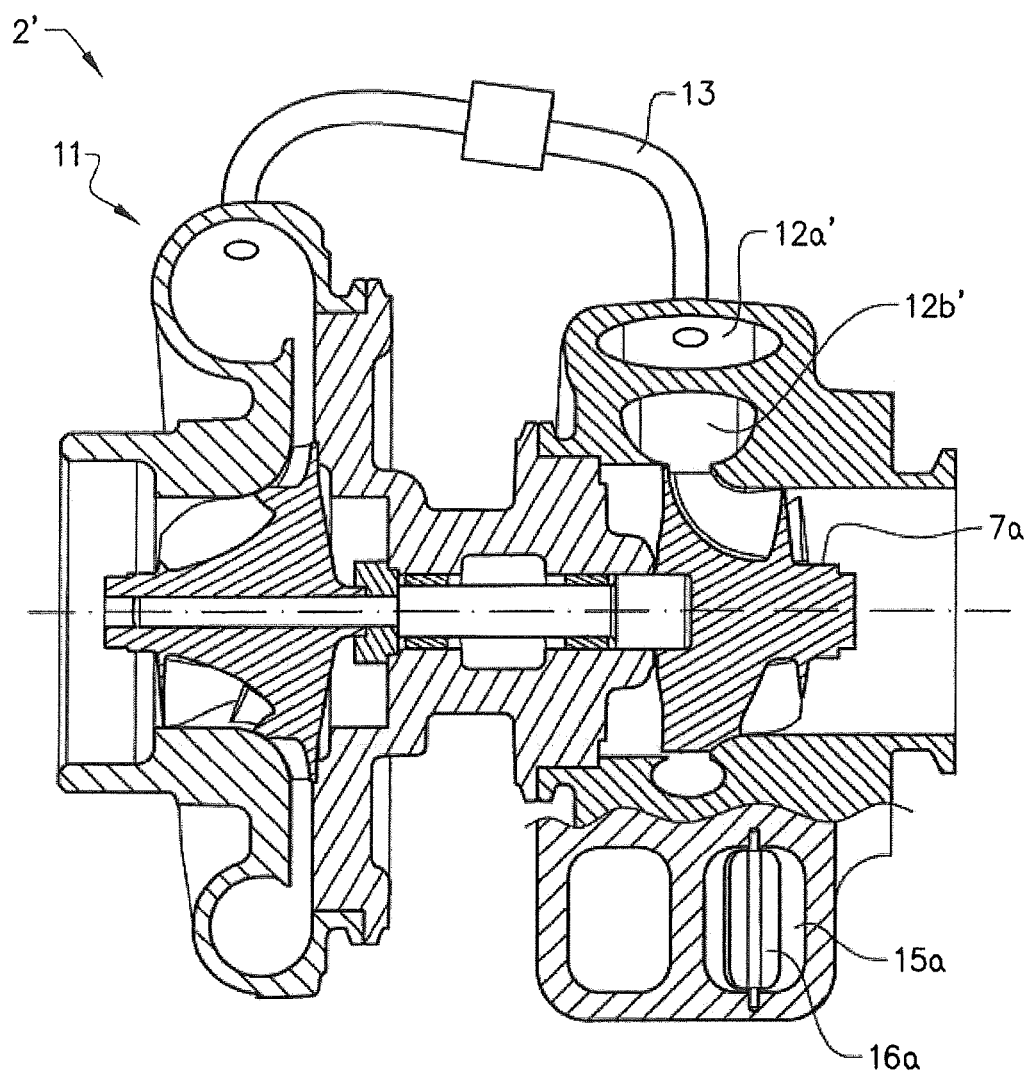
FIG. 2B discloses another preferred embodiment of a twin scroll turbocharger device according to the present disclosure.

FIG. 2B discloses another preferred embodiment of a twin scroll turbocharger device 2' according to the present disclosure. The embodiment of the twin scroll turbocharger device 2' has the same characteristics as previously described in relation to the embodiment disclosed in FIG. 2A, but according to the embodiment disclosed in FIG. 2B the first turbine scrolls 12a' is arranged outwardly in a radial direction of said second turbine scroll 12b' with reference to said turbine wheel 7a. In accordance with what was disclosed in relation to FIG. 2A; the first turbine scroll 12a' is arranged to be in fluid communication with the first turbine scroll inlet 15a. In order to provide the bypass functionality from the compressor 9 as previously described the first turbine scroll inlet 15a is provided with a first turbine scroll inlet valve 16a and the bypass conduit 13 is connected to be in fluid communication with the first turbine scroll 12a'. Providing one turbine scroll 12a' outwardly in a radial direction of another turbine scroll 12b' has the advantage that the leakage between the turbine scrolls 12a', 12b' is minimized due to the smaller separating wall compared to a side by side scroll embodiment.

Figure 3:
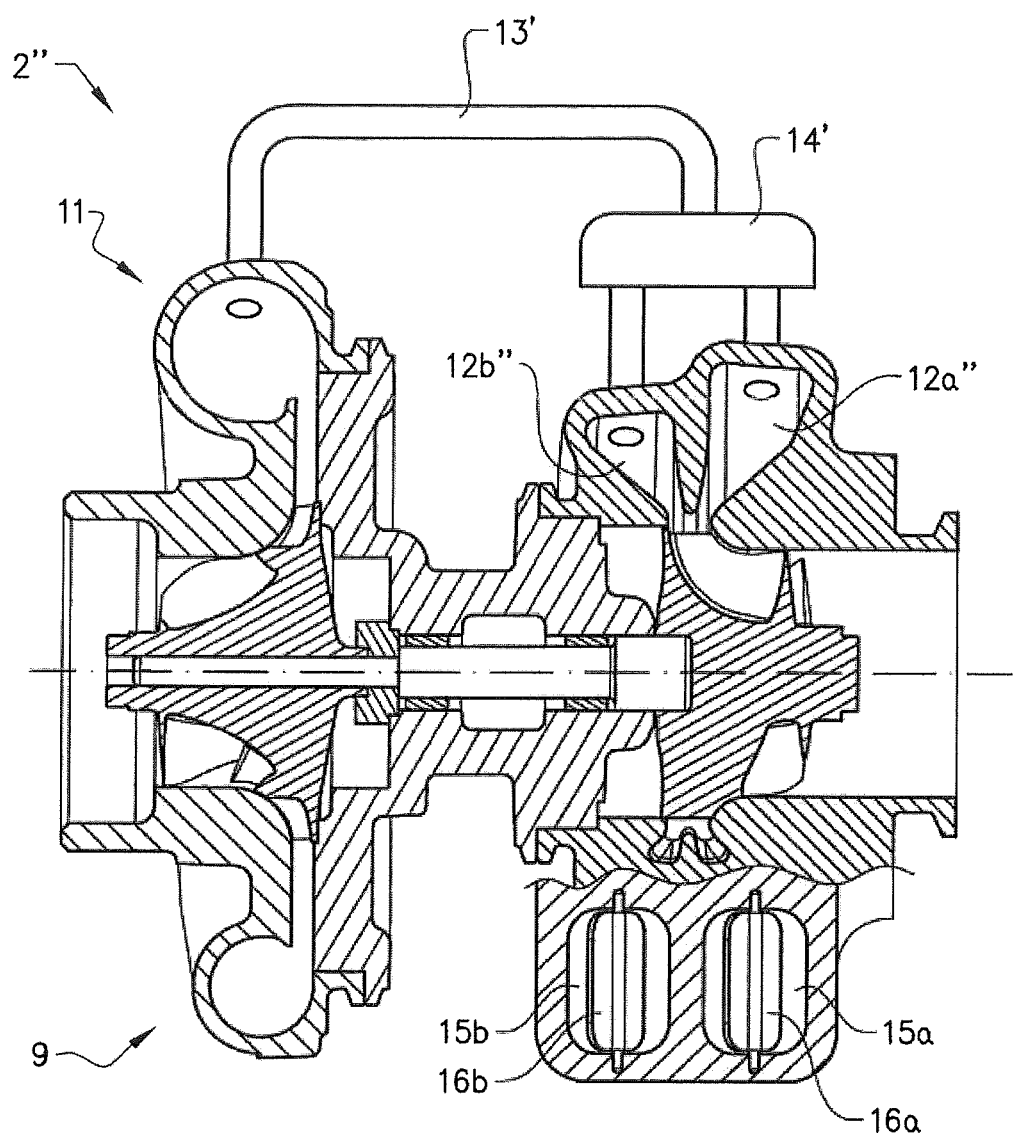
FIG. 3 discloses yet another preferred embodiment of a twin scroll turbocharger device according to the present disclosure.

Referring now to FIG. 3, that figure discloses yet another preferred embodiment of the present disclosure. The embodiment of the twin scroll turbocharger device 2" disclosed in FIG. 3 discloses how the first and second turbine scrolls 12a", 12b" may be configured in order to further improve the efficiency of the twin scroll turbocharger device 2". According to the embodiment disclosed in FIG. 3 the twin scroll turbocharger device 2" comprises a first and second turbine scroll 12a", 12b" with different cross sectional flow areas, wherein the first turbine scroll 12a" has a larger cross sectional flow area than the second turbine scroll 12b". Additionally, the bypass conduit 13' is provided to be connected to the compressor 9 and to both the first and second turbine scrolls 12a", 12b", such that both the first and second turbine scrolls 12a", 12b" may be in fluid communication with the compressor 9. Further, according to the embodiment of the twin scroll turbocharger device 2" disclosed in FIG. 3 the bypass conduit 13' is provided with a bypass conduit valve 14'. According to a preferred embodiment of the present disclosure the bypass conduit valve 14' has the functionality to:

control the bypass flow through the bypass conduit 13', and control if the first turbine scroll 12a", the second turbine scroll 12b" or both the first and the second turbine scrolls 12a", 12b" is/are set to be in fluid communication with the compressor 9 (when the bypass is activated).

The embodiment of the twin scroll turbocharger device 2" further comprises a first and a second turbine scroll inlet 15a, 15b with a first and second turbine scroll inlet valve 16a, 16b. The first turbine scroll inlet 15a is preferably connected to the first turbine scroll 12a" and the second turbine scroll inlet 15b is preferably connected to the second turbine scroll 12b", such that respective turbine scroll inlet 15a, 15b is in fluid communication with respective turbine scroll 12a", 12b". Providing the first and second turbine scroll inlets 15a, 15b with the first and second turbine scroll inlet valves 16a, 16b, and providing the bypass conduit 13' with the bypass conduit valve 14', enables that the twin scroll turbocharger device 2" can be operated in at least three discrete operating modes;

a first operating mode wherein the second turbine scroll inlet valve 16b is open, the first turbine scroll inlet valve 16a is closed and the bypass conduit valve 14' is set such that bypass is provided to the first turbine scroll 12a", a second operating mode where the first turbine scroll inlet valve 16a is open, the second turbine scroll inlet valve 16b is closed and the bypass conduit valve 14' is set such that bypass is provided to the second turbine scroll 12b", and a third operating mode where the first and second turbine scroll inlet valves 16a, 16b are open and the bypass conduit valve 14' is set to be closed.

The first operating mode may be preferred when the exhaust gas flow entering the turbine inlet is low, the second operating mode may be preferred when the exhaust gas flow entering the turbine inlet is intermediate and the third operating mode may be preferred when the exhaust gas flow is relatively high. What actual exhaust gas flow respective low, intermediate and high exhaust gas flows represent may e.g., be dependent of turbocharger specific characteristics. This will be further disclosed in relation to FIG. 4 below.

At specific operating conditions it may also be advantageous to set the first and second turbine scroll inlet valves 16a, 16b and the bypass conduit valve 14' to be open. As is apparent for a person skilled in the art the twin scroll turbocharger device 2" may also be operated at operating modes between the first, second and third mode where respective valve is partially closed and/or partially open. This applies to all embodiments disclosed herein.

Figure 4:
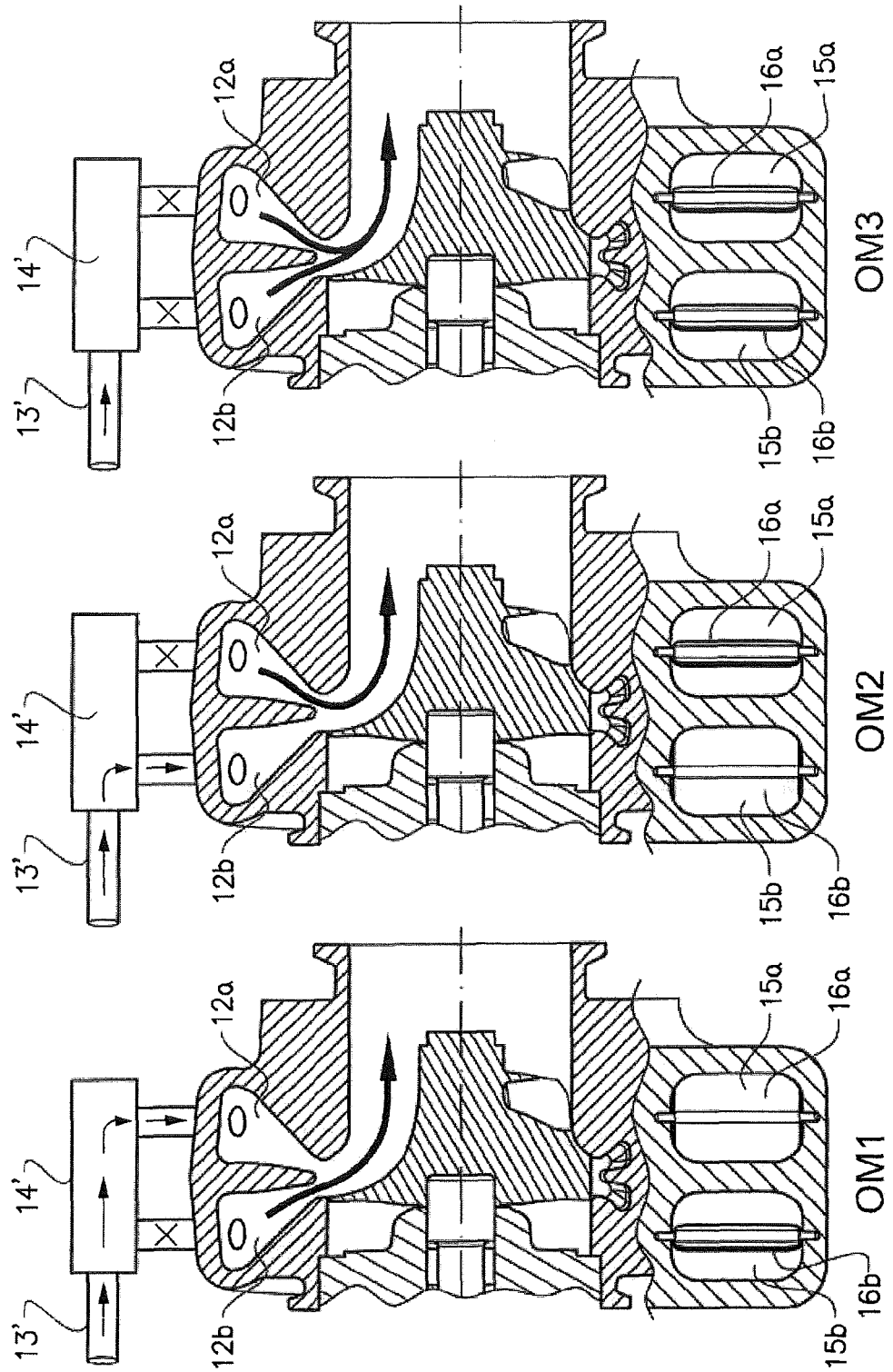
FIG. 4 schematically discloses three examples of operating modes of a twin scroll turbocharger device according to the present disclosure.

FIG. 4 refers to the embodiment previously disclosed in relation to 2A but with a bypass conduit valve 14' as disclosed in relation to FIG. 3. Further, FIG. 4 discloses the flow through the first and second scroll 12a, 12b and the bypass conduit 13' in the three operating modes OM1, OM2, OM3 as previously disclosed in relation to FIG. 3. In the embodiment disclosed in FIG. 4 the first and second turbine scrolls 12a, 12b have the same cross sectional flow area, and respective scroll is provided with a first and second turbine scroll inlet 15a, 15b with a respective first and second turbine scroll inlet valve 16a, 16b. The bypass conduit 13' is provided with a bypass valve 14' such that the flow through the bypass conduit 13' and to respective turbine scroll 12a, 12b is controllable.

In the first operating mode OM1 the second turbine scroll inlet valve 16b is open, the first turbine scroll inlet valve 16a is closed and the bypass conduit valve 14' is set such that bypass is provided to the first turbine scroll 12a.

In the second operating mode OM2 the first turbine scroll inlet valve 16a is open, the second turbine scroll inlet valve 16b is closed and the bypass conduit valve 14' is set such that bypass is provided to the second turbine scroll 12b.

In the third operating mode OM3 the first and second turbine scroll inlet valves 16a, 16b are open and the bypass conduit valve 14' is set to be closed.

The operating modes OM1, OM2, OM3 of the present disclosure as disclosed in, and described in relation to, FIGS. 3 and 4 is particularly advantageous if being implemented for a twin scroll turbocharger device 2" as disclosed in FIG. 3, wherein the first and second turbine scrolls 12a", 12b" are provided to have different cross sectional flow areas. However, even when the first and second scrolls 12a, 12b have the same cross sectional flow area as is disclosed in FIG. 4 controlling the bypass accordingly may be advantageous since it e.g., enables pulse separation to be utilized in order to improve the twin scroll turbocharger device efficiency.

In the embodiments referred to above; by controlling flow is meant controlling the fluid flow over a cross sectional flow area by setting a valve or like in a position from a closed to an open position, or in any partially closed or partially open position there between.

The foregoing disclosure has been set forth merely to illustrate example embodiments and is not intended to be limiting. Since modifications of the disclosed embodiments incorporating the spirit and substance of the disclosure may occur to persons skilled in the art, the disclosure should be construed to include everything within the scope of the appended claims and equivalents thereof. Additionally, the features of various implementing embodiments may be combined to form further embodiments of the invention.

What is claimed is:

1. A twin scroll turbocharger device for an internal combustion engine, the twin scroll turbocharger device comprising:
   a turbine with a turbine wheel configured to be driven by exhaust gas guided from the internal combustion engine, the turbine further comprising a first turbine scroll and a second turbine scroll,
      wherein the first turbine scroll is provided with a first turbine scroll inlet valve at a first turbine scroll inlet to control the exhaust gas flow through the first turbine scroll inlet of the first turbine scroll; and
      wherein the second turbine scroll is provided with a second turbine scroll inlet valve at a second turbine scroll inlet to control the exhaust gas flow through the second turbine scroll inlet of the second turbine scroll;
   a compressor with a compressor wheel connected to and configured to be driven by the turbine wheel to pump compressor gas to the internal combustion engine;
   a turbocharger housing enclosing the turbine and the compressor; and
   a bypass conduit that connects a pressurized portion of the compressor with the first and second turbine scrolls at a respective portion of each turbine scroll provided downstream, in relation to the exhaust gas flow, of a respective turbine scroll inlet valve,
      wherein the bypass conduit is configured to allow fluid communication between the compressor and the first and second turbine scrolls; and
      wherein the bypass conduit is provided with a bypass conduit valve that is configured to control fluid flow from the pressurized portion of the compressor through the bypass conduit if the compressor is in fluid communication with the first turbine scroll and/or the second turbine scroll.

2. The twin scroll turbocharger device according to claim 1, wherein the first and second turbine scrolls are arranged side by side with reference to a rotational direction of the turbine wheel.

3. The twin scroll turbocharger device according to claim 1, wherein the first turbine scroll is arranged outwardly in a radial direction with reference to the turbine wheel of the second turbine scroll.

4. The twin scroll turbocharger device according to claim 1, wherein the first and second turbine scrolls have equal cross sectional flow areas.

5. The twin scroll turbocharger device according to claim 1, wherein the first turbine scroll has a larger cross sectional flow area than the second turbine scroll.

6. The twin scroll turbocharger device according to claim 1, wherein the second turbine scroll has a larger cross sectional flow area than the first turbine scroll.

7. A method of controlling a twin scroll turbocharger device for an internal combustion engine, wherein the twin scroll turbocharger device comprises:
   a turbine with a turbine wheel driven by exhaust gas guided from the internal combustion engine,
      wherein the turbine further comprises a first turbine scroll and a second turbine scroll;
      wherein the first turbine scroll is provided with a first turbine scroll inlet valve at a first turbine scroll inlet, and the first turbine scroll inlet valve is controllable to be between an open position and a closed position to control the exhaust gas flow through the first turbine scroll; and
      wherein the second turbine scroll is provided with a second turbine scroll inlet valve at a second turbine scroll inlet to control the exhaust gas flow through the second turbine scroll inlet of the second turbine scroll;
   a compressor with a compressor wheel connected to and driven by the turbine wheel to pump compressor gas to the internal combustion engine;
   a turbocharger housing enclosing the turbine and the compressor; and
   a bypass conduit provided between a pressurized portion of the compressor and each of a portion of the first turbine scroll provided downstream, in relation to the exhaust gas flow, of the first turbine scroll inlet valve, and a portion of the second turbine scroll provided downstream, in relation to the exhaust gas flow, of the second turbine scroll inlet valve, the bypass conduit allowing fluid communication between the compressor and at least one of the first turbine scroll and the second turbine scroll,
      wherein the bypass conduit is provided with a controllable bypass conduit valve that is controllable to be in a closed position or in a position open to at least one of the first scroll inlet valve and the second scroll inlet valve to control the exhaust gas flow through the bypass conduit;
   the method comprising:
      when an exhaust gas flow from the internal combustion engine is equal to or less than a predetermined low flow,
      via an engine control unit,
         closing the first turbine scroll inlet valve; and
         opening the bypass conduit valve such that fluid flows from the pressurized portion of the compressor to the first turbine scroll, while the exhaust gas flow flows through the second turbine scroll.

8. The method according to claim 7,
   wherein the bypass conduit is provided between the pressurized portion of the compressor and each of the portion of the first turbine scroll provided downstream, in relation to the exhaust gas flow, of the first turbine scroll inlet valve and a portion of the second turbine scroll provided downstream, in relation to the exhaust gas flow, of a second turbine scroll inlet valve, wherein the bypass conduit allows fluid communication between the compressor and the first and second turbine scrolls; and
   wherein the bypass conduit valve is configured to control fluid flow from the pressurized portion of the compressor through the bypass conduit if the compressor is in fluid communication with at least one of the first turbine scroll and the second turbine scroll;
   wherein the second turbine scroll is provided with the second turbine scroll inlet valve at a second turbine scroll inlet;
   wherein the second turbine scroll inlet valve is controllable to be between an open position and a closed position to control the exhaust gas flow through the second turbine scroll; and wherein the method further comprises:

when the exhaust gas flow from the internal combustion engine increases to be higher than the predetermined low flow but lower than a predetermined high flow, via the engine control unit, opening the first turbine scroll inlet valve;

closing the second turbine scroll inlet valve; and opening the bypass conduit valve such that fluid flows from the pressurized portion of the compressor through the bypass conduit to the second turbine scroll, while the exhaust gas flow flows through the first turbine scroll.

9. The method according to claim 8 further comprising:

when the exhaust gas flow from the internal combustion engine is equal to or exceeds the predetermined high flow, via the engine control unit, opening all turbine scroll inlet valves, and closing the bypass conduit valve, while the exhaust gas flow flows through the first and second turbine scrolls.

10. The method according to claim 7, wherein the bypass conduit is provided between the pressurized portion of the compressor and each of the portion of the first turbine scroll provided downstream, in relation to the exhaust gas flow, of the first turbine scroll inlet valve and a portion of the second turbine scroll provided downstream, in relation to the exhaust gas flow, of a second turbine scroll inlet valve;

wherein the bypass conduit valve is configured to control a flow through the bypass conduit and to control if the compressor is in fluid communication with the at least one of the first turbine scroll and the second turbine scroll;

wherein the second turbine scroll is provided with the second turbine scroll inlet valve at a second turbine scroll inlet, wherein the second turbine scroll inlet valve is controllable to be between an open position and a closed position to control the exhaust gas flow through the second turbine scroll; and wherein the method further comprises:

when the exhaust gas flow from the internal combustion engine decreases to be lower than a predetermined high flow but higher than the predetermined low flow, via the engine control unit, closing the second turbine scroll inlet valve; and opening the bypass conduit valve such that fluid flows from the pressurized portion of the compressor through the bypass conduit to the second turbine scroll, while the exhaust gas flow flows through the first turbine scroll.

11. The method according to claim 7, wherein the bypass conduit is provided between the pressurized portion of the compressor and each of the portion of the first turbine scroll provided downstream, in relation to the exhaust gas flow, of the first turbine scroll inlet valve and a portion of the second turbine scroll provided downstream, in relation to the exhaust gas flow, of a second turbine scroll inlet valve;

wherein the bypass conduit valve is configured to control a flow through the bypass conduit and to control if the compressor is in fluid communication with the at least one of the first turbine scroll and the second turbine scroll;

wherein the second turbine scroll is provided with the second turbine scroll inlet valve at a second turbine scroll inlet;

wherein the second turbine scroll inlet valve is controllable to be between an open position and a closed position to control the exhaust gas flow through the second turbine scroll; and wherein the method further comprises:

when the exhaust gas flow from the internal combustion engine decreases to be equal to or lower than the predetermined low flow, via the engine control unit, closing the first turbine scroll inlet valve;

opening the second turbine scroll inlet valve; and opening the bypass conduit valve such that fluid flows from the pressurized portion of the compressor through the bypass conduit to the first turbine scroll, while the exhaust gas flow flows through the second turbine scroll.

* * * * *